United States Patent [19]

Fairchild et al.

[11] 4,109,742
[45] Aug. 29, 1978

[54] STEERING AND WIDTH CONTROLS FOR EXPANDABLE TANDEM ROLLERS

[75] Inventors: Louis F. Fairchild, Cedar Rapids; Robert R. Brecht, Keystone, both of Iowa

[73] Assignee: Iowa Manufacturing Company, Cedar Rapids, Iowa

[21] Appl. No.: 771,437

[22] Filed: Feb. 24, 1977

[51] Int. Cl.² ............................................. B62D 57/00
[52] U.S. Cl. ...................................... 180/20; 180/140; 404/126
[58] Field of Search .................. 180/20, 140; 404/126, 404/125, 122

[56] References Cited

U.S. PATENT DOCUMENTS

| | | | |
|---|---|---|---|
| 2,748,509 | 6/1956 | Brown et al. .................... 180/140 X |
| 3,185,245 | 5/1965 | Hoyt ..................................... 180/140 |
| 3,279,637 | 10/1966 | Olson et al. ...................... 180/6.48 X |
| 3,868,194 | 2/1975 | Ferguson ............................ 180/20 X |

Primary Examiner—John A. Pekar
Attorney, Agent, or Firm—Haven E. Simmons; James C. Nemmers

[57] ABSTRACT

An hydraulic system controlling the steering and width of an articulated expandable tandem roller turns both rolls at the same time in opposite directions when the machine is being steered or in the same direction when being expanded or contracted. An operator controlled electrical system, also governing travel of the machine in either opposite direction, controls steering and width adjustment and automatically reverses the "hand" of the steering when the direction of travel of the machine is reversed.

10 Claims, 3 Drawing Figures

STEERING AND WIDTH CONTROLS FOR EXPANDABLE TANDEM ROLLERS

BACKGROUND OF THE INVENTION

U.S. Pat. No. 3,868,194 discloses an expandable articulated tandem roller in which both rolls can be steered. As there shown, however, only one roll at a time can be steered, whether merely to change direction of the machine or to expand or contract it. In particular, only the forward roll is steered, the trailing roll being locked in a "straight ahead" position. Width adjustment, especially, requires rather substantial time and effort, even with a skilled operator, since one and then the other roll must be separately turned several times and the machine largely halted between each. Furthermore, turning either roll while the machine is stationary is often apt to "tear" the mat, the chances of which are greatly reduced if the machine is moving when either roll is turned. Hence the chief object of the present invention is to provide a system and controls by which both rolls of a machine of the kind concerned can be turned simultaneously and while moving, whether for steering or width adjustment.

SUMMARY OF THE INVENTION

The foregoing object is accomplished by providing a hydraulic system in which a spool type, four-way steering valve having three positions controls fluid flow to two pairs of steering rams in such a manner that the forward roll is turned in the desired direction while the trailing roll at the same time is turned in the opposite direction, thus providing greater and quicker maneuverability than when just the forward roll is steered, as in the foregoing patent. As a consquence each roll need be turned only half as far in order to accomplish an equivalent turn, thus still further reducing the chances of mat "tear". Expansion and contraction of the machine is accomplished through a second, spool type, four-way width valve having two positions disposed in the hydraulic circuit between the two pairs of rams. Shifting of the width valve reverses the direction of fluid flow between the two pairs of rams and, when operated in conjunction with the steering valve, causes the forward roll to turn in the same direction as the trailing roll turns. Thus successive manipulation of both valves expands or contracts the machine without having to halt or slow it. In addition, several hydraulic accumulators or "shock absorbers" are incorporated into the system to cushion the sudden changes in pressure in the system when the steering valve, which is of the "all-on, all-off" type, is opened and closed. The accumulators thus delay response to rapid openings and closing of the steering valve, especially when making small steering corrections, the consequent lag between valve movement and steering response smoothing out the corrections.

The steering and width valves are actuated by solenoids controlled by switches on a panel before the operator in a seat atop the machine. The steering switch has momentary "left" and "right" contacts, spring centered to a "neutral" position. The width switch is spring loaded to the "off" position and of momentary contact in the "on" position. When steering, only the steering switch is used and turns the rolls as previously mentioned. When the width switch is also moved to its "on" position, the forward roll thereafter turns in the opposite direction while the trailing roll continues to turn in the same direction as before. The operator's seat rotates so that the operator can face in the direction of machine travel and incorporates a switch which reverses the effect or "hand" of the steering switch when the direction of machine travel and the operator's seat are reversed so that "left" and "right" are thereby automatically correct to the operator. The operator's seat switch is also tied into the travel control switch so that the machine must be at rest before the seat switch can reverse the effect of the steering switch. Further features and advantages of the present invention will appear from the drawings and the detailed description which follows.

DETAILED DESCRIPTION OF THE PREFERRED EMBODIMENT

Figure 1:
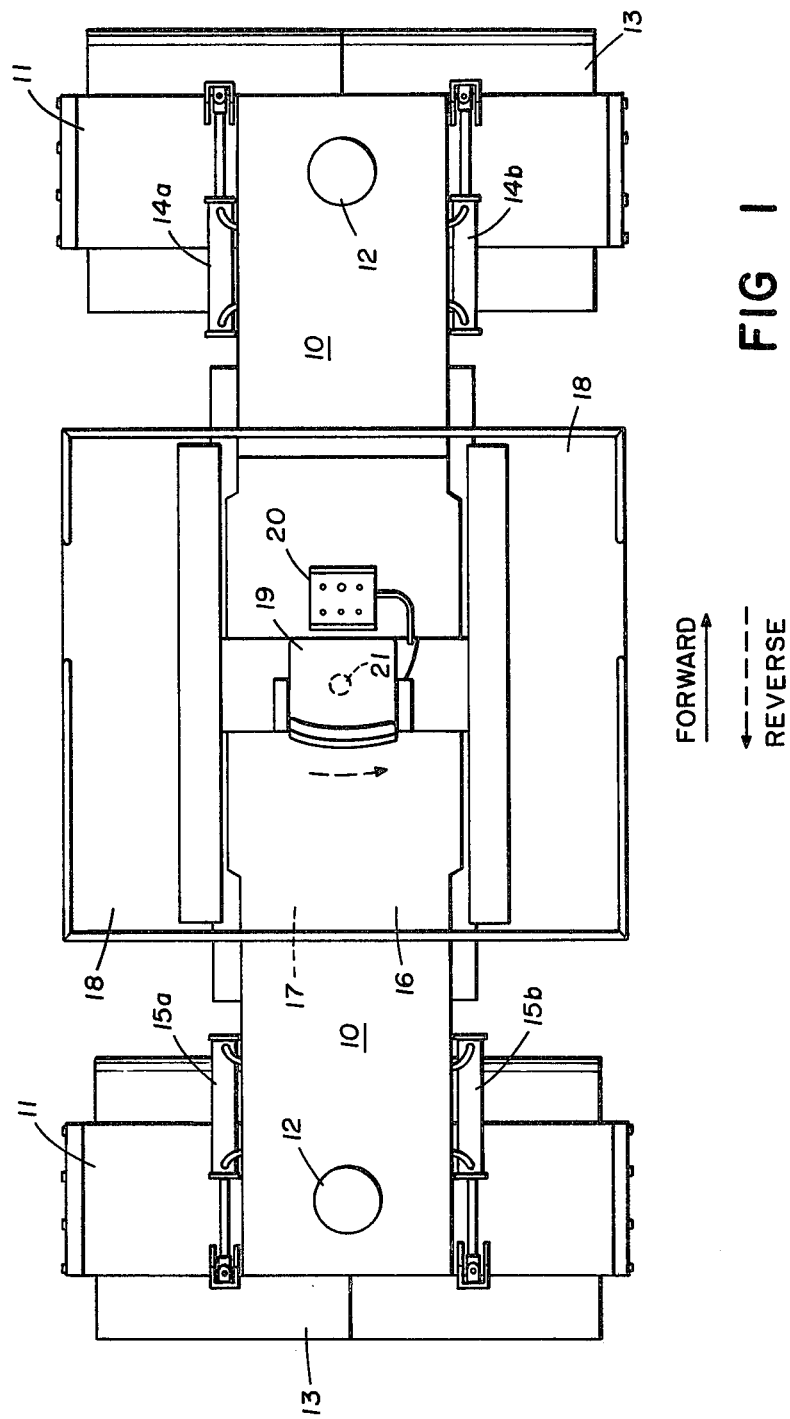
FIG. 1 is a top plan view of an articulated and expanded tandem roller to which the present invention is applied.

The machine, as shown in FIG. 1, essentially comprises an elongated body 10 at the ends of which are yokes 11, vertically journaled at 12, which rotably carry split rolls 13. The rolls 13 are turned or steered about the journals 12 by suitable means such as two pairs of hydraulic rams 14$a$, 14$b$ and 15$a$, 15$b$. Centrally along the body 10 is an operator's platform 16, beneath which is the engine compartment indicated at 17 and to each side of which are cantilevered fuel, water and oil tanks 18. In the middle of the platform 16 is disposed the operator's seat 19 to which is attached the control panel 20. The seat 19 is arranged so that it and the control panel 20 can pivot about a vertical post, indicated at 21, in order to face in either the "forward" or "reverse" direction indicated in FIG. 1. The machine is propelled by an engine driven, variable displacement hydraulic pump located in the engine compartment 17 and hydraulic motors within the rolls 13. Each roll 13 is preferably vibrated by an inner, hydraulically driven eccentric mechanism. Since the present invention concerns neither the propulsion nor vibratory arrangements, they need not be further described or shown.

Figure 2:
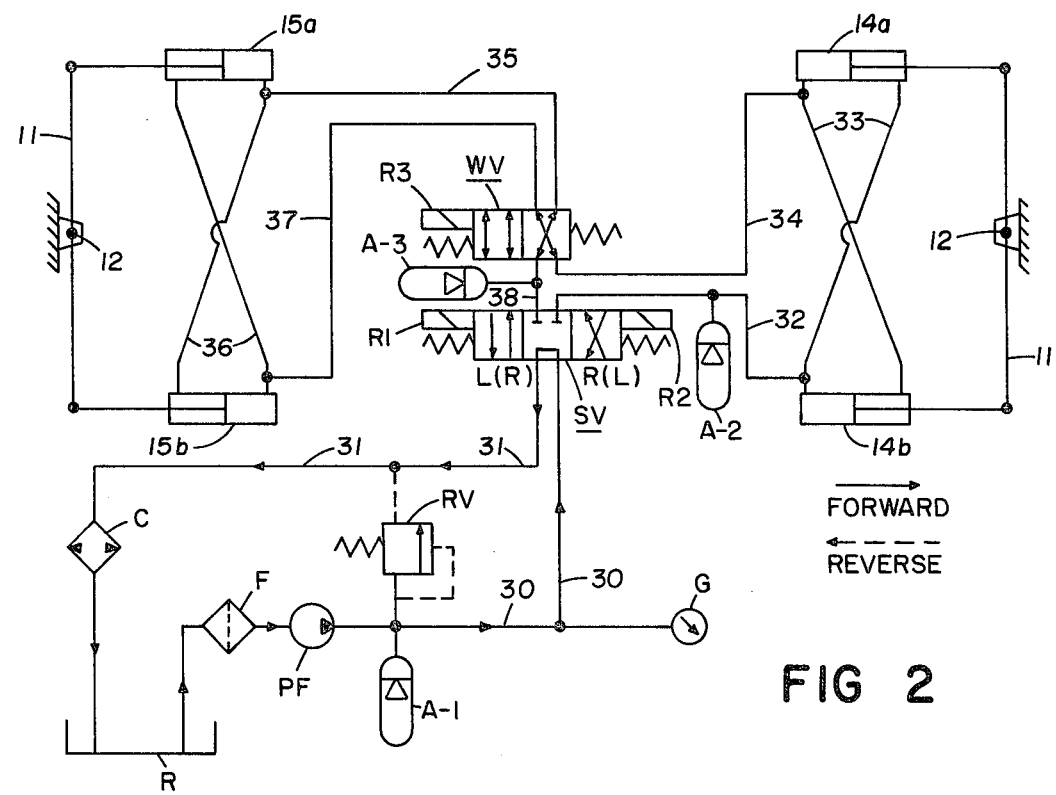
FIG. 2 is a schematic diagram of the hydraulic circuitry according to the present invention by which the machine of FIG. 1 is steered and expanded or contracted.

Turning to FIG. 2, the hydraulic steering circuit comprises a fixed displacement pump PF, also engine driven, which draws through a filter F from the hydraulic reservoir R. The output of the pump PF is delivered through a line 30 to a steering valve SV from which a return line 31 leads back to the reservoir R through a cooler C. Into the line 30 is interposed a pressure gauge G and a hydraulic accumulator A1 having a free floating piston working against nitrogen gas. Between the two lines 30 and 31 is placed a typical pressure relief valve RV. The valve SV is a four-way spool type, solenoid actuated, and, as shown, has two opposite positions and an intermediate, inactivated or "neutral" one in which the output of the pump PF through the line 30 is merely lead directly back to the reservoir R through the line 31. From the valve SV a line 32 is connected to the rams 14$a$, 14$b$, which are interconnected by lines 33 for conjoint operation in opposite directions, and from which a line 34 leads to the width valve WV. The latter is also a solenoid operated, four-way spool type having two positions, being normally in the one shown in FIG. 2. A line 35 connects the valve WV with the rams 15a, 15b, which are also interconnected by lines 36 for conjoint operation in opposite directions, and from which a line 37 leads back to the valve WV and a line 38 from the latter to the valve SV. Into the lines 32 and 38 are also interposed hydraulic accumulators A2 and A3 similar to A1.

Assuming, now, that the machine is proceeding in the "forward" of the two directions indicated in FIG. 2, which are merely arbitrary for purposes of description, suppose a "right" turn is to be made. The steering valve SV is shifted to the left in FIG. 2 whereupon oil from line 30 passes through the valve SV into line 38, through the width valve WV, line 35 and into the rams 15a, 15b, extending the former and contracting the latter by virtue of the lines 36. The "trailing" yoke 11 thus turns counterclockwise, the oil from ram 15b being exhausted through line 37, valve WV and line 34 into the rams 14a, 14b, extending the former and contracting the latter by virtue of the line 33. The "leading" yoke 11 thus turns clockwise, the oil from ram 14b being exhausted through line 32 back through the valve SV and line 31 to the reservoir R. Similarly, if a "left" turn is to be made, the valve SV is shifted to the right causing a reverse flow of oil, so that "forward" yoke 11 turns counterclockwise and the "trailing" yoke clockwise. Once the proper direction is attained, the valve SV is shifted back and forth until the machine again assumes a straight course and the valve SV is in its neutral position. If now the machine is to be expanded to the "right", for instance, the valve SV is moved to the "left" to begin a "right" turn. Then moments later the width valve WV is shifted to the right and at the same time the steering valve SV is shifted to the right as for a "left" turn. The result is that the "trailing" yoke 11 continues to turn counterclockwise while the "leading" yoke 11 changes direction and also turns counterclockwise, whereby the machine begins to assume a crabbed attitude. By manipulation of the two valves SV and WV, alternately steering, widening, steering, widening, etc., the desired width and direction is gradually attained. Then to re-contract the machine, the foregoing procedure is reversed, in the sense that the contraction sequence would begin with a turn to the "left", instead of to the "right". If the machine is traveling in the "reverse" direction in FIG. 2, then of course "left" and "right" are also "reversed" so that the directions of movement of valve SV would be opposite to those described above in order to produce like steering effects. However, when adjusting width in this case it is not also necessary to shift the steering valve SV whenever the width valve WV is shifted, as will be later explained.

Figure 3:
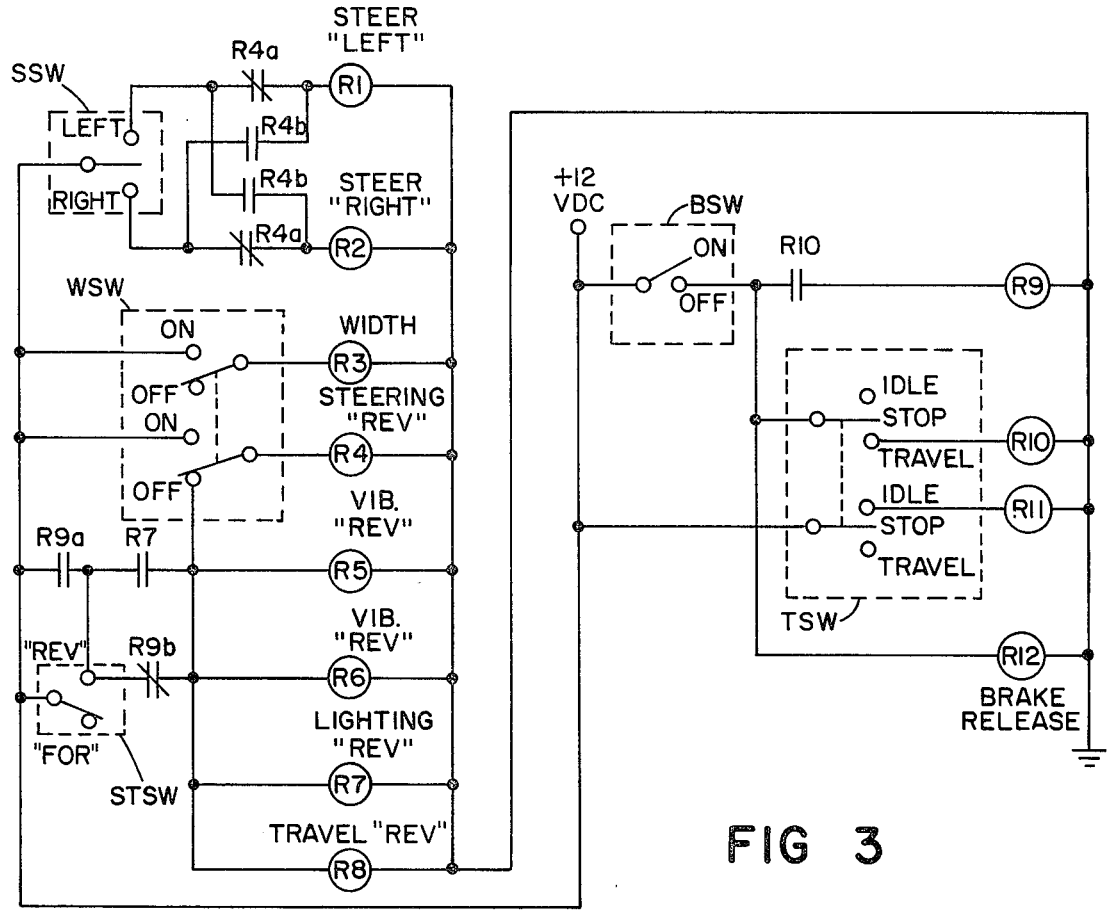
FIG. 3 is a schematic diagram of the electrical circuitry by which the hydraulic circuit in FIG. 2 is controlled.

While the machine could, of course, be steered and its width adjusted in the manner described when traveling in either direction, it is much easier for the operator if the controls for valves SV and WV and other related components are tied together so that their effect is automatically reversed whenever, but not until, the main direction of travel of the machine is reversed. The essentials of an appropriate circuit for accomplishing this is shown in FIG. 3. That circuit, it should be realized, comprises only part of the much more extensive circuitry controlling the engine, traction, vibrators, lights, etc. which, being largely conventional and not essential to the present invention, is not shown or described except to the extent incorporated into FIG. 3 for explanatory purposes.

Turning then to FIG. 3, and also referring to FIG. 2, the solenoids which operate the steering valve SV are identified as R1 and R2, for "left" and "right" with respect to the "forward" direction indicated in FIG. 2, while the solenoid operating the width valve WV is identified as R3. It will be observed that R1 and R2 are activated by the "left" and "right" positions of a steering switch SSW through two pairs of normally closed contacts R4a of a steering "reverse" relay R4 having two other pairs of contacts R4b which are normally open. The width solenoid R3 is activated through one pair of contacts of a width switch WSW, the other pair of whose contacts are in series with the steering "reverse" relay R4. The switches SSW and WSW are both of the momentary contact type, spring loaded to the positions shown in FIG. 3. When switch WSW is in the position shown in FIG. 3, in parallel with the steering "reverse" relay R4 are also two vibrator "reverse" relays R5 and R6, a head and tail lamp "reverse" relay R7 and a travel "reverse" relay R8. When activated, the relays R5 and R6 change the direction of rotation of the vibrators in the rolls 13, the relay R7 reverses the road lighting, and the relay R8 reverses the direction of propulsion of the machine, all when a seat switch STSW is shifted from its "forward" to its "reverse" position in the manner later to be described.

The switch STSW is incorporated in the operator's seat 19 and post 21 so that it is activated to one position or the other depending upon in which direction the seat 19 is rotated to face. The switch STSW is in parallel with the normally open contacts R7 of the lighting "reverse" relay R7 and the normally open contacts R9a of a relay R9 having normally closed contacts R9b in series with the "reverse" position of STSW and the "reverse" relays R4 – R8. The relay R9 is in series with the normally open contacts R10 of a relay R10, the latter relay being in series with one of the two "travel" positions of a travel switch TSW. A relay R11 is in series with one of the "idle" positions of the travel switch TSW, while relays R9 (through contacts R10) and R10 (through switch TSW) are in parallel with each other and a brake release relay R12. The last three relays, in turn, are in series with a brake release switch BFW which, together with the switches SSW, WSW and STSW, are mounted on the control panel 20 before the operator. It will be understood that the relay R10 strokes the pump to propel the machine while the relay R11 controls the position of the engine throttle. The relay R12 when activated releases the brakes of the machine. It will also be noted that the travel switch TSW cannot activate the Relay R10 in order to propel the machine unless the brake release relay R12 is first activated by the switch BSW. Thereafter, the operation of the machine insofar as the foregoing circuit is concerned is as follows:

Assume that the machine is to travel in the "forward" direction indicated in FIGS. 1 and 2 so that the seat switch STSW is in its "forward" position. The brake release switch BSW is then moved to the "off" position and the travel switch TSW to the "travel" position, thus energizing the relay R10 and closing its contacts R10 to energize the relay R9. The latter will thereupon close the contacts R9a and open contacts R9b. Hence, even if the seat switch STSW is thereafter moved from the "forward" to the "reverse" position, the "reverse" relays R4 – R8 will remain inactive since the contacts R7 and R9b are open. Then, if a "left" turn is to be made, the steering switch SSW is pushed to and held in its "left" position. The solenoid R1 is thus energized through one of the two closed contacts R4a to move the valve SV to the right in FIG. 2, whereupon the "forward" yoke 11 will turn counterclockwise and the "trailing" yoke 11 clockwise, as previously explained. In the case of a "right" turn the solenoid R2 would be similarly energized through the other closed contact R4a.

If now the machine is to be expanded to the "left", the steering switch SSW is first pushed to and held in its "left" position, causing the "forward" yoke 11 to turn counterclockwise and the "trailing" yoke 11 clockwise. Then the width switch WSW is also moved to and held in its "on" position, one of its two contacts energizing the solenoid R3 to shift the width valve WV, whereupon the "forward" yoke 11 would continue to turn counterclockwise but the trailing yoke 11 would begin also to turn counterclockwise, as will be seen from FIG. 2. However, at the same time the other contacts of WSW energize the steering "reverse" relay R4 causing its contacts R4a to open and its contacts R4b to close. Hence, the steering switch SSW (still in its "left" position) de-energizes the solenoid R1 and energizes the solenoid R2 to shift the steering valve SV as if for a "right" turn. As will be observed from FIG. 2, the end result will be that the "trailing" yoke 11 will in fact continue to turn clockwise while the "forward" yoke 11 will in fact reverse direction and also turn clockwise, causing the machine to begin to assume a crabbed attitude. Continued manipulation of first the steering switch SSW alone, then both it and the width switch WSW, the switch SSW alone, etc. will produce the desired width and direction of the machine. To contract the machine, the procedure is reversed in that the steering switch SSW is first moved to the "right" position and then the width switch WSW is also closed, etc., until the machine again assumes a tandem attitude.

If later the machine is to travel in the "reverse" direction indicated in FIGS. 1 and 2, the travel switch TSW is moved to the "stop" or "idle" position, de-energizing the relay R10 and opening its contacts R10 to drop out the relay R9. The contacts R9a of the latter then open while the contacts R9b close. The operator's seat 19 and control panel 20 are then swung about to face in the opposite direction, whereupon the seat switch STSW is moved to its "reverse" position. "Reverse" relays R4–R8 are thereupon energized through the closed contacts R9b, the relay R7 then closing its contacts R7. At the same time relay R4 opens the contacts R4a and closes the contacts R4b to "reverse" the effect of the steering switch SSW since "left" and "right" are now "reversed" to the operator. Then, when the travel switch TSW is moved again to its "travel" position, the machine and the vibrators "reverse" direction owing to the energization of relays R5, R6 and R8. Relay 10 again activates relay R9, closing its contacts R9a and opening its contacts R9b. Hence, swinging the operator's seat 19 around again will not affect "reverse" relays R4–R8 since power to them is maintained through the closed contacts R7 and R9a. Thereafter, steering and width adjustment is accomplished as before with one exception. It will be observed from FIG. 2 that when the machine is traveling in the "reverse" direction, the "forward" yoke 11 always changes its direction of turn when the width switch WSW is closed while that of the "trailing" yoke 11 stays the same. Hence, there is no need at the same time to cause a shift of the steering valve SV as there was when the machine was traveling in the "forward" direction in order to change the direction of turn of the "leading" yoke 11. This is borne out by FIG. 3 from which it will be noted that the steering "reverse" relay R4 remains energized when the width switch WSW is moved to its "on" position so that there is no accompanying shift of the contacts R4a and R4b as when traveling in the "forward" direction.

The accumulators A1 – A3 are helpful when steering with the switch SSW, especially when small steering corrections are made and are rapidly done as is usually the case. The sudden pressure changes or rises in the line 30 when the valve SV is shifted by solenoids R1 or R2 are dampened by the accumulator A1 which then unloads when the valve SV is returned to its "neutral" position. The two accumulators A2 and A3 perform similar functions with respect to the rams 14a, 14b and 15a, 15b, as it will be noted that they are interposed in the lines 32 and 38 which alternately lead from the valve SV depending upon which direction it is moved. Hence the accumulators A2 and A3 also alternately load and unload. The overall effect of the three accumulators A1–A3 increases the lag between steering valve movement and steering reaction and makes the latter less abrupt, giving somewhat the effect, especially during small, rapid corrections, as if there were an actual "steering wheel" instead of the switch SSW. In a working example of the invention, a gas pressure in the accumulators of 200 psi in the case of A1 and 500 psi in the case of A2 and A3 has proved satisfactory, about 500 psi being needed to turn the yokes 11 in that case.

Though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

We claim:

1. In a self-propelled road machine having a body and a pair of rollers disposed at spaced locations longitudinally of the body, each roller being articulated about an upright axis with respect to the body for dirigible movement and providing a substantially continuous ground engaging surface laterally of the machine, at least one of the rollers being driven for propulsion of the machine in either of two opposite directions along a road, and hydraulic circuit means to provide said dirigible movement both for lateral steering of the machine and for selectively adjusting the two rollers between tandem and echelon positions with respect to each other during travel of the machine along the road in either of said directions, said means including first and second hydraulic means operatively associated with respective ones of the rollers to provide said dirigible movement and a source providing flow of hydraulic fluid under pressure, the improvement in said hydraulic circuit means comprising: first valve means; first conduit means interconnecting said source and the first valve means for supply of presurized hydraulic fluid to the first valve means; second conduit means interconnecting the first valve means and the first hydraulic means; second valve means; third conduit means interconnecting the first hydraulic means and the second valve means; fourth conduit means interconnecting the second valve means and the second hydraulic means; fifth conduit means interconnecting the second hydraulic means and the second valve means; sixth conduit means interconnecting the first and second valve means; the first valve means selectively providing either an interconnection of the first conduit means with the second conduit means for circulating presurized hydraulic fluid from the first valve means serially to the first hydraulic means, the second valve means, the second hydraulic means, the second valve means and back to the first valve means effective to provide for dirigible movement of the two rollers in opposite directions about said axes for steering of the machine in one lateral direction, or alternately an interconnection of the first valve means with the sixth conduit means for circulating presurized hydraulic fluid from the first valve means serially to the second valve means, the second hydraulic means, the second valve means, the first hydraulic means and back to the first valve means effective to provide for dirigible movement of the two rollers in opposite directions about said axes for steering of the machine in the other lateral direction; the second valve means selectively providing either an interconnection of the third with the fifth conduit means and the fourth with the sixth conduit means or alternately an interconnection of the third with the fourth conduit means and the fifth with the sixth conduit means, one of said second valve means interconnections being effective substantially immediately to cause the aforesaid dirigible movements of the rollers for steering of the machine in said lateral directions when the first valve means is also providing either one of its said interconnections, the other of said second valve means interconnections being effective substantially immediately to cause dirigible movement of the two rollers in the same direction about said axes for adjustment of the rollers between tandem and echelon positions when the first valve means is also providing either one of its said interconnections, the second valve means normally providing said one of its interconnections and optionally providing said other of its interconnections.

2. The machine of claim 1 wherein each of said first and second hydraulic means comprises a pair of double acting hydraulic rams interconnected for conjoint operation in opposite directions.

3. The machine of claim 1 wherein the first valve means includes a first valve member movable between first and second opposite hydraulic means activating positions and an intermediate neutral position, the two opposite positions providing said selective interconnections of the first valve means, and wherein the second valve means includes a second valve member movable between opposite first and second positions respectively providing said normal and optional interconnections by the second valve means; and including first hydraulic shock absorbing means interposed in the second conduit means, and second hydraulic shock absorbing means interposed in the sixth conduit means.

4. The machine of claim 3 including third hydraulic shock absorbing means interposed in the first conduit means.

5. The machine of claim 3 including first electromagnetic means effective to move the first valve member selectively between said opposite positions, the first valve member being normally in said neutral position, and second electromagnetic means effective to move the second valve member from its first to its second of said positions, the second valve member being normally in said first position; first switch means having first and second positions and a neutral position; second switch means having first and second positions respectively causing the second electromagnetic means to provide said first and second positions of the second valve member; said first switch positions respectively causing the first electromagnetic means to provide said first and second positions of the first valve member when the second switch means is in its first position.

6. The machine of claim 5 wherein the first switch means includes a switch operating member biased to said neutral position and of the momentary contact type with respect to said first and second positions; and wherein the second switch means includes a switch operating member biased to said first position and of the momentary contact type with respect to said second position.

7. The machine of claim 5 including third switch means having first and second positions dermining the direction of travel of the machine in one of said directions, the third switch means when in its first position and the second switch means is in its second position causing the first position of the first switch means to provide said second position of the first valve member and the second position of the first switch means to provide said first position of the first valve member, the third switch means when in its second position and the second switch means is in its second position causing the first position of the first switch means to provide said first position of the first valve member and the second position of the first switch means to provide said second position of the first valve member.

8. The machine of claim 7 wherein the machine includes operator seat means facing so that an operator sitting therein can face in the one of said directions in which the machine is traveling, the third switch means being associated with the seat means.

9. The machine of claim 8 wherein the seat means comprises a single seat rotatable to face in either of said directions of travel, the third switch means being operated by rotation of the seat so that the third switch means is in its first position when the seat is facing and the machine is traveling in one of said directions and in its second position when the seat is facing and the machine is traveling in the other of said directions.

10. The machine of claim 7 including fourth switch means having first and second positions, the fourth switch means when in its first position being effective to halt travel of the machine in either of said directions and to permit the third switch means to determine the direction of travel of the machine in one or the other of said directions in the manner aforesaid, the fourth switch means when in its second position being effective to provide travel of the machine in one of said directions determined by the third switch means as aforesaid, the fourth switch means when in its second position also preventing the third switch means from thereafter altering the direction of travel of the machine.

* * * * *